US009622243B2

(12) United States Patent
Doppler et al.

(10) Patent No.: US 9,622,243 B2
(45) Date of Patent: Apr. 11, 2017

(54) CONTEXT TRANSFERS AND MULTI-BAND OPERATION FOR WIRELESS NETWORKS

(71) Applicant: Nokia Technologies Oy, Espoo (FI)

(72) Inventors: Klaus F. Doppler, Albany, CA (US); Carl S. Wijting, Espoo (FI); Jean-Philippe Kermoal, Copenhagen (DK); Antti S. Sorri, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 30 days.

(21) Appl. No.: 13/855,870

(22) Filed: Apr. 3, 2013

(65) Prior Publication Data

US 2013/0223377 A1 Aug. 29, 2013

Related U.S. Application Data

(62) Division of application No. 12/120,226, filed on May 13, 2008, now Pat. No. 8,442,531.

(Continued)

(51) Int. Cl.
*H04W 4/00* (2009.01)
*H04W 72/04* (2009.01)
(Continued)

(52) U.S. Cl.
CPC .......... *H04W 72/0453* (2013.01); *H04L 1/04* (2013.01); *H04L 1/1893* (2013.01);
(Continued)

(58) Field of Classification Search
None
See application file for complete search history.

(56) References Cited

U.S. PATENT DOCUMENTS

| 5,697,055 A | 12/1997 | Gilhousen et al. ............ 455/436 |
| 7,590,064 B1 | 9/2009 | Zhang et al. ................. 370/235 |

(Continued)

FOREIGN PATENT DOCUMENTS

| EP | 1 641 187 A1 | 3/2006 |
| EP | 1 750 404 A1 | 2/2007 |

(Continued)

OTHER PUBLICATIONS

Qiwei, Wang, et al.; "Route and spectrum selection in dynamic spectrum networks," Consumer Communications and Networking Conference, 2006. CCNC 2006. 20-06, 3$^{rd}$ IEEE Las Vegas, NV, USA Jan. 8-10, 2006, Picatawa , NJ, USA, IEEE, vol. 1, Jan. 8, 2006, pp. 625-629.

(Continued)

*Primary Examiner* — Edan Orgad
*Assistant Examiner* — Rebecca Song
(74) *Attorney, Agent, or Firm* — Harrington & Smith

(57) ABSTRACT

Various example embodiments are disclosed relating to wireless networks and relating to context transfers and multi-band operation in wireless networks. In an example embodiment, a multi-band scheduler may be provided for use in a wireless node. The multi-band scheduler may be configured to: receive one or more data units of a flow; assign each received data unit of the flow to a first frequency band of a plurality of frequency bands; determine a band transfer condition for the flow; and perform a context transfer from the first frequency band to a second frequency band for the flow based on the determined band transfer condition.

3 Claims, 16 Drawing Sheets

Related U.S. Application Data

(60) Provisional application No. 60/938,018, filed on May 15, 2007.

(51) Int. Cl.

| | | |
|---|---|---|
| *H04L 1/04* | (2006.01) | |
| *H04L 1/18* | (2006.01) | |
| *H04L 5/00* | (2006.01) | |
| *H04W 36/00* | (2009.01) | |
| *H04W 72/12* | (2009.01) | |
| *H04W 88/06* | (2009.01) | |
| *H04L 1/00* | (2006.01) | |

(52) U.S. Cl.
CPC .......... *H04L 5/0037* (2013.01); *H04L 5/0044* (2013.01); *H04L 5/0064* (2013.01); *H04L 2001/0097* (2013.01); *H04W 36/0055* (2013.01); *H04W 72/1268* (2013.01); *H04W 88/06* (2013.01)

(56) References Cited

U.S. PATENT DOCUMENTS

| | | | |
|---|---|---|---|
| 7,881,254 B1 | 2/2011 | Loc et al. ................ 370/328 |
| 2004/0037261 A1* | 2/2004 | Suzuki ................ H04J 13/004 |
| | | | 370/342 |
| 2004/0090947 A1 | 5/2004 | Wilborn et al. ............ 370/345 |
| 2004/0192204 A1* | 9/2004 | Periyalwar et al. ........... 455/25 |
| 2004/0246898 A1 | 12/2004 | Peisa et al. ................ 370/325 |
| 2004/0264475 A1* | 12/2004 | Kowalski ................ 370/395.5 |
| 2005/0111389 A1* | 5/2005 | Dick ........................ H04L 1/16 |
| | | | 370/278 |
| 2005/0176473 A1 | 8/2005 | Melpignano ................ 455/574 |
| 2005/0249127 A1 | 11/2005 | Huo et al. ................ 370/252 |
| 2005/0259663 A1 | 11/2005 | Ode et al. ................ 370/395.4 |
| 2005/0272467 A1 | 12/2005 | Chiu et al. ................ 455/553.1 |
| 2006/0227744 A1 | 10/2006 | Metke et al. ................ 370/331 |
| 2007/0076663 A1* | 4/2007 | Qi et al. ................ 370/331 |
| 2007/0110009 A1 | 5/2007 | Bachmann et al. .......... 370/338 |
| 2007/0183432 A1* | 8/2007 | Kim ................ H04L 1/0001 |
| | | | 370/400 |
| 2008/0049718 A1* | 2/2008 | Chindapol et al. ........... 370/351 |
| 2008/0101295 A1 | 5/2008 | Tomita et al. ............... 370/331 |
| 2008/0146230 A1 | 6/2008 | Pandian et al. ................ 455/436 |
| 2009/0040967 A1 | 2/2009 | O'Neill ........................ 370/328 |
| 2009/0109902 A1* | 4/2009 | Axnas et al. ................ 370/328 |
| 2009/0207810 A1 | 8/2009 | Petrovic et al. ............... 370/331 |
| 2010/0105393 A1 | 4/2010 | Etemad et al. ............... 455/437 |
| 2010/0330914 A1 | 12/2010 | Chandra ........................ 455/62 |
| 2012/0076110 A1 | 3/2012 | Kenward et al. ............. 370/331 |

FOREIGN PATENT DOCUMENTS

| | | |
|---|---|---|
| WO | WO-2006/012018 A1 | 2/2006 |
| WO | WO-2008/139319 A2 | 11/2008 |

OTHER PUBLICATIONS

Akyildiz, Ian F., et al.; "Nest generation/dynamic spectrum access/cognitive radio wireless networks: A survey," Computer Networks, Elsevier Science Publishers B.V., Amsterdam, NL, vol. 50, No. 13, Sep. 15, 2006, pp. 2127-2159.

Pokhariyal, A.; Pedersen, K.I.; Monghal, G.; Kovacs, I. Z.; Rosa, C.; Kolding, T.E.; Mogensen, P.E., "HARQ Aware Frequency Domain Packet Scheduler with Different Degrees of Fairness for the UTRAN Long Term Evolution," Vehicular Technology Conference, 2007. VTC2007-Spring. IEEE 65th , vol., no., pp. 2761,2765, Apr. 22-25, 2007.

Dahlmaa, E.; Frenger, P.; Jiann-Ching Guey; Klang, G.; Ludwig, R.; Meyer, M.; Wiberg, N.; Zangi, K., "A framework for future radio access," Vehicular Technology Conference, 2005. VTC 2005-Spring. 2005 IEEE 61st , vol. 5, no., pp. 2944,2948 vol. 5, May 30-Jun. 1, 2005.

Herdin, M., "A Chunk Based OFDM Amplify-and-Forwarding Scheme for 4G Mobile Radio Systems," Communications, 2006. ICC '06. IEEE International Conference on , vol. 10, no., pp. 4507,4512, Jun. 2006.

Sternad, M. et al., "The winner B3G system MAC concept", Vehicular technology conference, (2006).

Hooli, K. et al., "Flexible spectrum use between inner radio access networks", Proc. IST Mobile & wireless communications (2006).

"International Application Serial No. PCT/IB2008/001204, International Search Report and Written Opinion mailed on Feb. 12, 2009", p. 220, 29pgs.

Min°, Emilio et al., "Winner II intramode and intermode cooperation schemes definition", IST-4-027756 Winner II, D4.8.1, v1.0, (Jun. 30, 2006), 1-79.

Rinne, Mikko et al., "Dual Bandwidth Approach to New Air Interface", WWRF#11 WG4 Category: a; new concepts for next generation systems related to the White Paper areas. 10.-11.6.2004, Oslo, (Nov. 6, 2004), 1-6.

* cited by examiner

CONTEXT TRANSFERS AND MULTI-BAND OPERATION FOR WIRELESS NETWORKS

CROSS-REFERENCE TO RELATED APPLICATIONS

This application is a divisional of U.S. patent application Ser. No. 12/120,226, filed May 13, 2008, which claims the benefit of U.S. Provisional Application Ser. No. 60/938,018, filed May 15, 2007, the disclosure of which is incorporated herein by reference in its entirety.

BACKGROUND

Wireless networks have been developed that operate in different frequency bands, e.g., 900 MHz, 1800 MHz, 1900 MHz, 2.0 MHz, 3.5 MHz, and others. These are just a few examples of wireless frequency bands that may be used or are available for usage. Each frequency band typically includes a number of channels which may be assigned to users or mobile terminals. Each channel may sometimes include a number of sub-channels, e.g., multiple subcarriers and/or time slots. Multi-band cellular devices are capable of transmitting or receiving on one of several bands, e.g., depending on the available wireless service in an area. Some Wireless Local Area Network (WLAN) devices, such as access points and user deices, may also be multi-mode or multi-band, having the ability to operate in one of several modes or frequency bands, which may be associated with different standards. A number of different wireless standards have been developed, such as the IEEE (The Institute of Electrical and Electronics Engineers) 802.11 family of specifications, e.g., IEEE 802.11b, 802.11a, 802.11g, wireless specifications related to WiMAX or IEEE 802.16, specifications related to cellular communications such as GSM (Global System for Mobile Communications), and many others.

However, multi-band operation is typically quite limited in such devices. There is a need for techniques that may provide improved usage of multiple frequency bands in wireless networks.

SUMMARY

Various example embodiments are disclosed relating to wireless networks, and relating to context transfers and multi-band operation in wireless networks.

According to an example embodiment, a method may include transmitting, from a wireless node, a first data unit via a first channel of a first frequency band of a plurality of frequency bands, selecting a second frequency band of the plurality of frequency bands, performing a context transfer at the wireless node from the first frequency band to the second frequency band, and transmitting, from the wireless node, a second data unit via a second channel of the second frequency band.

In another example embodiment, an apparatus may include a wireless transceiver, a controller or processor, memory, and a multi-band scheduler. The apparatus may be configured to transmit, from a wireless node, a first data unit via a first channel of a first frequency band of a plurality of frequency bands; select a second frequency band of the plurality of frequency bands; perform a context transfer at the wireless node from the first frequency band to the second frequency band; and transmit, from the wireless node, a second data unit via a second channel of the second frequency band.

In another example embodiment, a method may include transmitting one or more data units of a group of data units via a first channel of a first frequency band in a wireless network using an ARQ process; re-assigning the group of data units and associated control data from the first frequency band to a second frequency band; and continuing to transmit the group of data units via a second channel of the second frequency band using the ARQ process.

In an example embodiment an apparatus may include a wireless transceiver, and a multi-band scheduler. The apparatus may be configured to: transmit one or more data units of a group of data units via a first channel of a first frequency band in a wireless network using an ARQ process; re-assign the group of data units and associated control data from the first frequency band to a second frequency band; and continue to transmit the group of data units via a second channel of the second frequency band using the ARQ process.

In another example embodiment a method may include transmitting a data unit via a first channel of a first frequency band in a wireless network using an ARQ process; failing to receive an indication that the data unit was successfully received; performing a context transfer from the first frequency band to a second frequency band, including re-assigning one or more data units, including the transmitted data unit, and at least some associated control data of the one or more data units, from the first frequency band to the second frequency band; and retransmitting the transmitted data unit using a second channel of the second frequency band according to the ARQ process.

In another example embodiment, an apparatus may include a wireless transceiver, and a controller. The apparatus (or the controller) may be configured to: transmit a data unit via a first channel of a first frequency band in a wireless network using an ARQ process; fail to receive an indication that the data unit was successfully received; perform a context transfer from the first frequency band to a second frequency band, including re-assigning one or more data units, including the transmitted data unit, and at least some associated control data of the one or more data units, from the first frequency band to the second frequency band; and retransmit the transmitted data unit using a second channel of the second frequency band according to the ARQ process.

In another example embodiment, a method may include transmitting data via a first channel on a first frequency band of a plurality of frequency bands in a wireless network; detecting a condition relating to the first frequency band; reassigning (or transferring) at least some control data relating to the first frequency band to a second frequency band of the plurality of frequency bands; transferring data stored in data transmission queues associated with the first frequency band to data transmission queues associated with the second frequency band; and transmitting the transferred data via the second frequency band.

According to another example embodiment, an apparatus may include a wireless transceiver and a controller. The apparatus (or the controller) may be configured to: transmit data via a first channel on a first frequency band of a plurality of frequency bands in a wireless network; detect a condition relating to the first frequency band; reassign at least some control data relating to the first frequency band to a second frequency band of the plurality of frequency bands; transfer data stored in data transmission queues associated with the first frequency band to data transmission queues associated with the second frequency band; and transmit the transferred data via the second frequency band.

According to another example embodiment, a method may include receiving one or more data units of a flow at a wireless node; assigning each received data unit of the flow to a first frequency band of a plurality of frequency bands; determining a band transfer condition for the flow; and performing a context transfer from the first frequency band to a second frequency band for the flow based on the determined band transfer condition.

In another example embodiment, a method may include receiving one or more data units of a first flow at a wireless node; assigning each received data unit of the first flow to a first frequency band of a plurality of frequency bands; receiving one or more data units of a second flow at a wireless node; assigning each received data unit of the second flow to a second frequency band of the plurality of frequency bands; determining a band transfer condition for the first flow; and performing a context transfer from the first frequency band to the second frequency band for the first flow based on the determined band transfer condition.

In another example embodiment, a multi-band scheduler may be provided for use in a wireless node. The multi-band scheduler may be configured to: receive one or more data units of a flow; assign each received data unit of the flow to a first frequency band of a plurality of frequency bands; determine a band transfer condition for the flow; and perform a context transfer from the first frequency band to a second frequency band for the flow based on the determined band transfer condition.

In yet another example embodiment, an apparatus may include a data transmission queue for each of a plurality of frequency bands including at least a first data transmission queue for a first frequency band and a second data transmission queue for a second frequency band; a multi-band scheduler configured to receive data units, and to assign each data unit to one of the data transmission queues for one of the frequency bands; a resource scheduler for each of the plurality of frequency bands, including at least: a first resource scheduler configured to schedule data units from the first data transmission queue for transmission via resources of the first frequency band; and a second resource scheduler configured to schedule data units from the second data transmission queue for transmission via resources of the second frequency band.

For example, a method may include using a first frequency band for communication, the first frequency band being dedicated to a network operator; making a determination that a second frequency band is available for use, the second frequency band, at least in some areas, being shared among a plurality of network operators or between a network operator and other radio technologies; and using the second frequency band based on the determination, in addition to the first frequency band.

The details of one or more implementations are set forth in the accompanying drawings and the description below.

DETAILED DESCRIPTION

Figure 1:
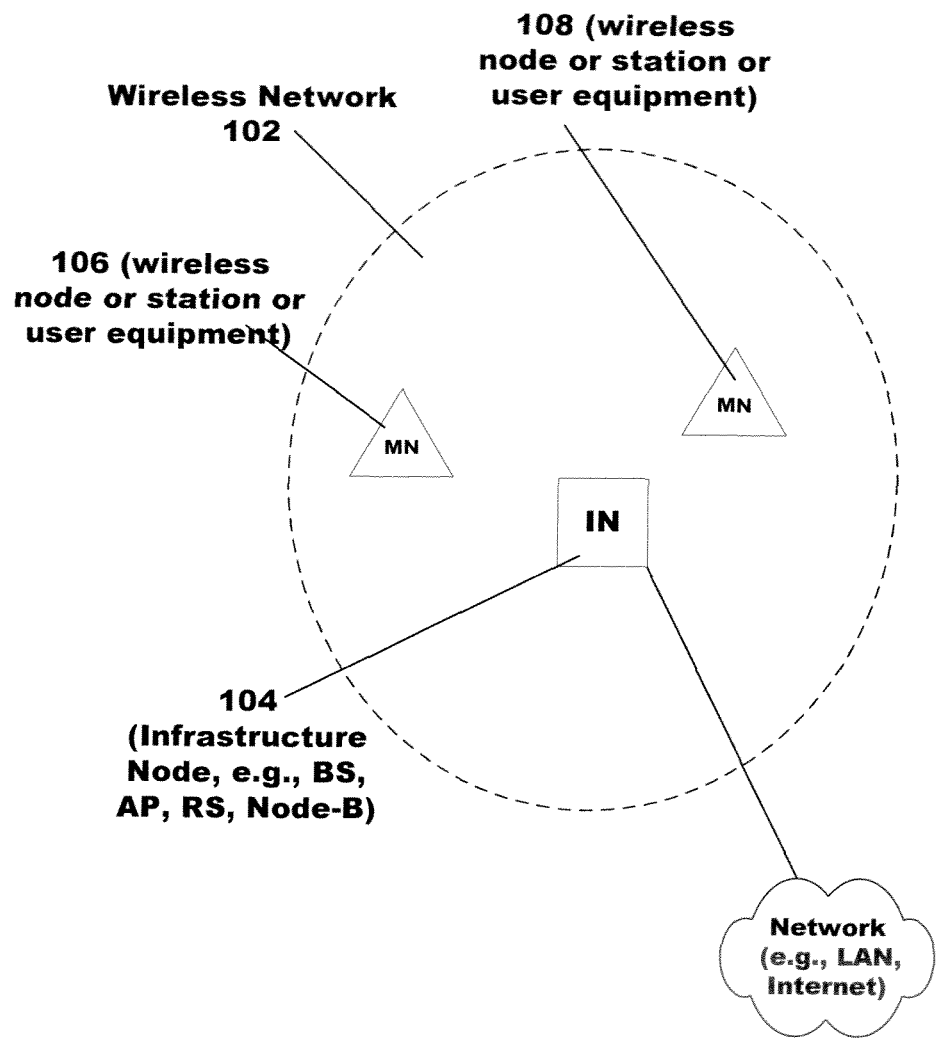
FIG. 1 is a block diagram illustrating a wireless network according to an example embodiment.

Referring to the Figures in which like numerals indicate like elements. FIG. 1 is a block diagram illustrating a wireless network according to an example embodiment. Wireless network 102 may include a number of wireless nodes or stations, such as a wireless infrastructure node 104 (which may include an access point (AP) or base station, relay station, a node B, or the like), and one or more mobile nodes or mobile stations (or user equipment or user terminals), such as wireless nodes 106 and 108. While only one infrastructure node 104 and two wireless nodes or mobile stations (or user equipment or user terminals) 106, 108 are shown in wireless network 102, any number may be provided. Each wireless node, e.g., nodes 106, 108, in network 102 may be in wireless communication with the wireless infrastructure node 104, and may even be in direct communication with each other. Wireless infrastructure node 104 may be coupled to a fixed network, such as a Local Area Network (LAN), Wide Area Network (WAN), Radio Access Network (RAN), the Internet, etc., and may also be coupled to other wireless networks or to other infrastructure nodes.

Figure 2:
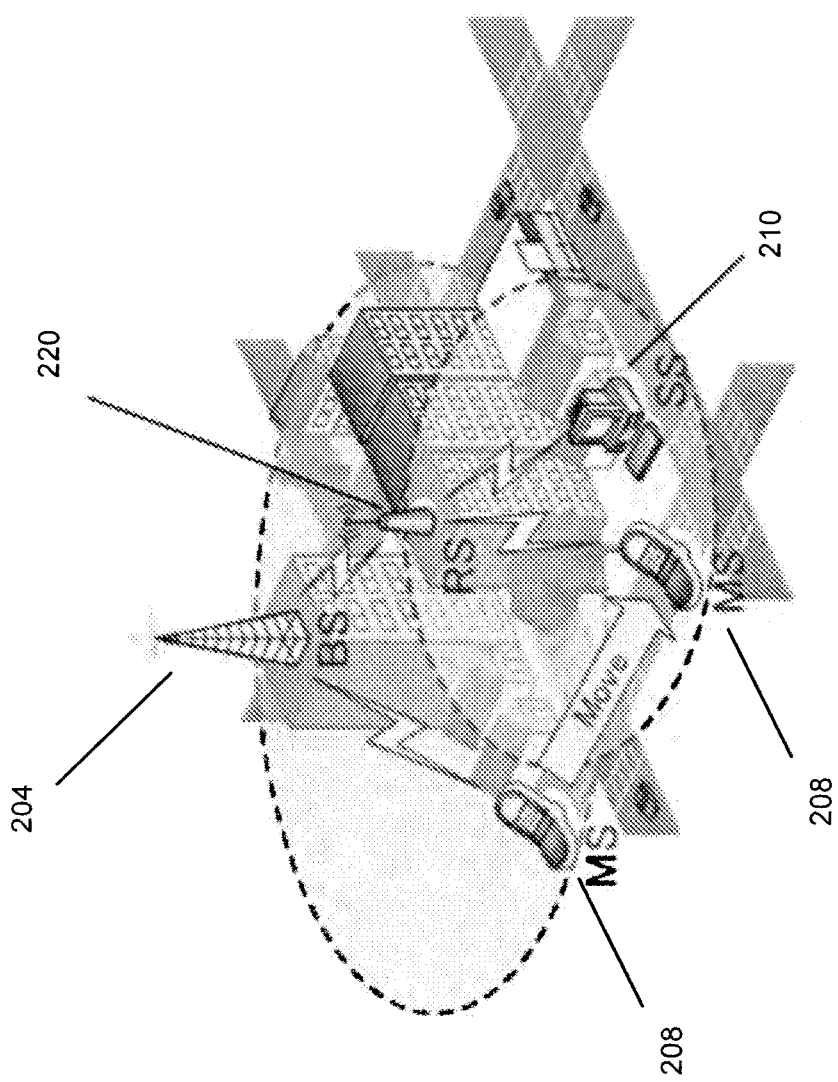
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with abuse station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2. Therefore, the use of relay nodes or relay stations may extend the range and improve the coverage of the cell or network. Thus, a wireless network that employs one or more relay nodes or relay stations may be an example of a multi-hop wireless network and may sometimes be referred to as a relay enhanced cell, a relay network, or the like.

Figure 3:
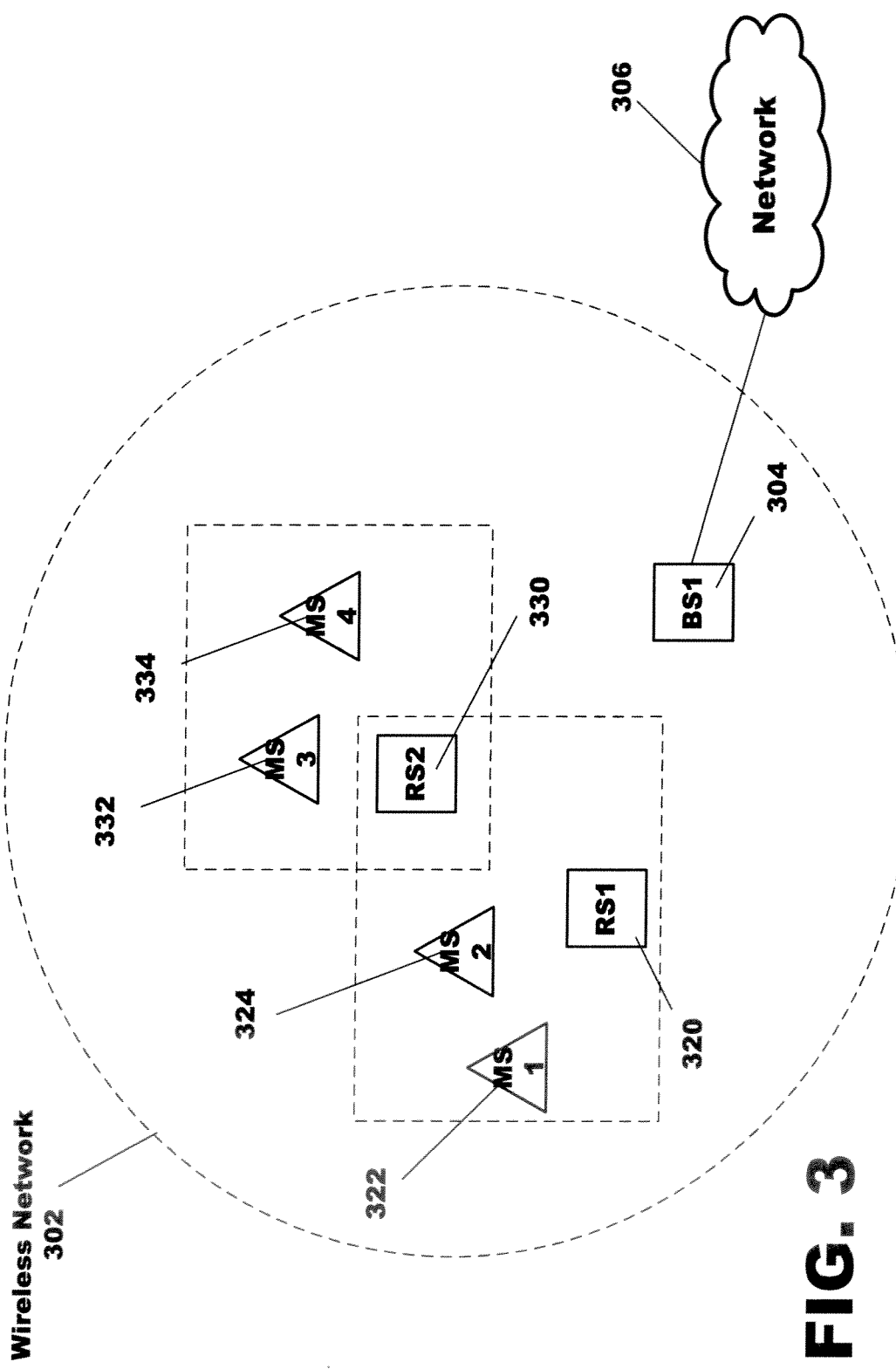
FIG. 3 is a block diagram illustrating a wireless network according to an example embodiment.

FIG. 3 is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with relay station RS1 320, and MS3 332 and MS4 334 communicating with relay station RS2 330. As shown, relay station RS2 330 also communicates with relay station RS1 320. While only one base station, two relay stations, and four mobile stations are shown in wireless network 302, any number of base stations, relay stations (also referred to as relay nodes), and mobile stations or mobile nodes (also referred to as user terminals) may be provided. The base station 304 may be coupled to a fixed network 306, such as a Wide Area Network (WAN), the Internet, etc., and may also be coupled to other wireless networks. The group of stations MS1 322, MS2 324, and RS2 330 may communicate with the base station BS1 304 via the relay station RS1 320. The group of stations MS3 332, MS4 334, may communicate with the base station BS1 304 via the relay station RS2 330, which communicates with the base station BS1 304 via the relay station RS1 320.

The various embodiments described herein may be applicable to a wide variety of wireless network technologies, such as, for example, WLAN (wireless local area network) networks (e.g., IEEE 802.11 type networks), IEEE 802.16 MAX networks, cellular networks, relay networks, multi-hop networks, 3GPP related networks including Long Term Evolution (LTE) of 3GPP, HSDPA (high speed downlink packet access), UMTS Terrestrial Radio Access Network (UTRAN), wireless networks based on orthogonal frequency division multiplexing (OFDM), orthogonal frequency division multiple access (OFDMA) or other techniques, radio networks, or other wireless networks. These are merely some example networks or technologies, and the various embodiments described herein are not limited thereto. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode, as well as an ad-hoc mode in which wireless nodes or stations may communicate directly via a peer-to-peer network, for example.

The term "wireless node" or "node," or wireless station or the like, may include, for example, a wireless mobile device, mobile station or user equipment, an access point (AP), base station or other infrastructure node, a wireless personal digital assistant (PDA), a cell phone, an 802.11 WLAN phone, a wireless mesh point, or any other wireless device. An infrastructure node may include, as examples, a base station, an access point, a relay station or relay node, anode-B, or any other infrastructure node. These are merely a few examples of the wireless devices that may be used to implement the various embodiments described herein, and this disclosure is not limited thereto.

According to an example embodiment, one or more wireless nodes (e.g., base stations, relay nodes, and/or mobile nodes/user terminals) in a wireless network or relay enhanced cell may include wireless (or radio) interfaces for each of a plurality of frequency bands. One or more of the wireless nodes in a wireless network may have the capability of transmitting and receiving on multiple frequency bands, for example.

Figure 4:
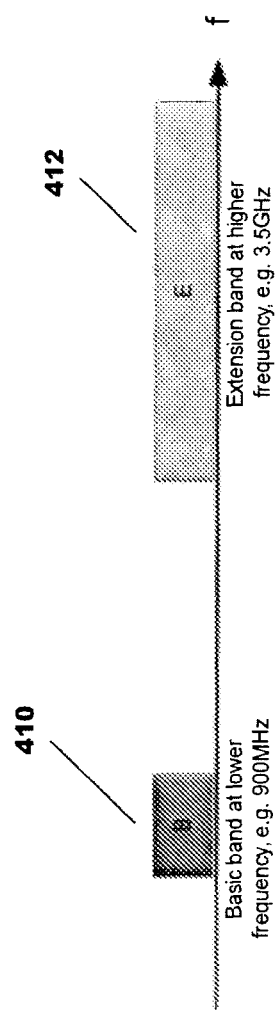
FIG. 4 is a diagram illustrating multiple frequency bands that may be used by a base station according to an example embodiment.

FIG. 4 is a diagram illustrating multiple frequency bands that may be used by a base station (or access point or Node B) according to an example embodiment. A base station may be able to transmit and receive signals via multiple frequency bands, such as a basic or band 410 and an extended or "E" band 412. Or these frequency bands may be referred to as a first frequency band (or first band) and a second frequency band (or second band), or vice versa, for example. Although only two frequency bands are illustrated, the base station (and other nodes in a wireless network) may be capable of transmitting and/or receiving signals on any number (e.g., 2, 3, 4, 5, 6,) of frequency bands. For example, the basic or B band may be provided at a band around 900 MHz, while the extended or E band may be provided at around 3.5 GHz. These are merely examples, and any frequencies may be used for the frequency bands that are used by the wireless nodes.

Figure 5:
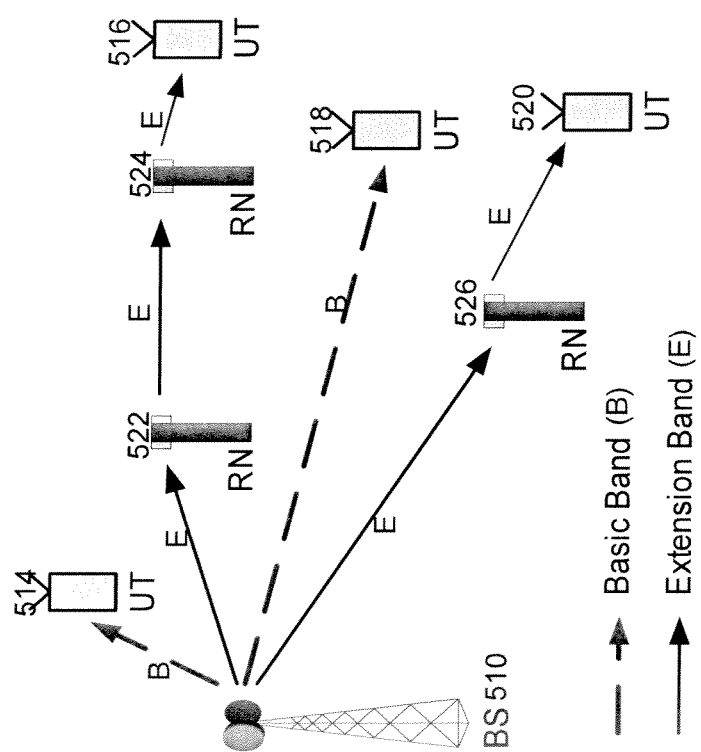
FIG. 5 is a diagram illustrating a multi-band wireless network according to an example embodiment.

FIG. 5 is a diagram illustrating a multi-band wireless network according to an example embodiment. According to an example embodiment, the wireless network of FIG. 5 may be a relay enhanced cell, having a base station (BS) 510, one or more relay nodes (RN), and one or more user terminals (UT). BS 510 may include wireless interfaces for both B band and E band. For example, due to a lower frequency range (e.g., 900 MHz) of B band (and therefore, e.g., lower attenuation) as compared to E band (e.g., 3.5 GHz), BS 510 may be able to provide direct service to a number of UTs within a significant coverage area, such as to UTs 514, 518. Relay nodes (RNs) 522, 524 and 526 may transmit and receive in E band this example. For example, RN 522 may forward signals received via E band from BS 510 to RN 524 via E band. RN 524 may then forward these signals via E band to UT 516. RN 526 may similarly forward signals between BS 510 and UT 520 via E band. Signal paths for B band are shown by dashed lines, while signal paths for E band are shown with solid lines. For example, there may be a group of UTs that cannot be reached via B band (e.g., UTs with an E band only interface, or UTs that are outside the direct range of BS 510 via B band). Thus, in this example, BS 510, as a multi-band device, may communicate via both B and E bands, for example, or via any number of frequency bands.

Figure 6:
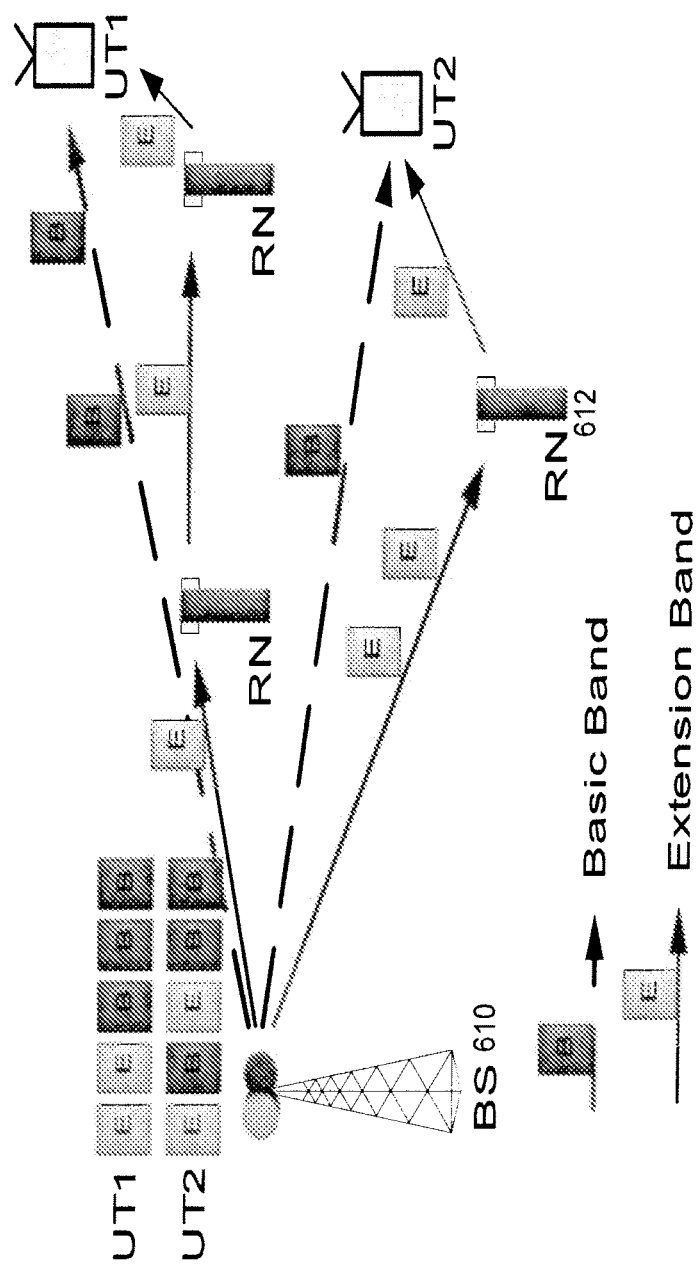
FIG. 6 is a diagram illustrating operation of a multi-band wireless network in a downlink direction according to another example embodiment.

FIG. 6 is a diagram illustrating operation of a multi-band wireless network in a downlink direction according to another example embodiment. In the example of FIG. 6, BS 610 may transmit data on B band, E band or both bands, while RNs may communicate via E band (in this example), and UTs (UT1 and UT2) may communicate via both B band and E band. Packets directed to one or both UTs arrive at the BS 610, and may be segmented into one or more smaller data units, such as cells, radio transmission units, etc., for transmission, or may be transmitted as packets. BS 610 may then transmit the data units to UT1 and UT2 via B band, E band, or a combination of B and E bands, for example.

For example, referring to FIG. 6, in order to provide load balancing or substantially balance the traffic loads on B and E bands, BS 610 may transmit data units to UT1 and UT2 via both E band and B band. For example, BS 610 may include a multi-band scheduler (MBS) to schedule data units for transmission via multiple bands. For example, BS 610 may include a MBS to schedule a data unit for transmission on B band or E band, for example, which may be transmitted to UT1 or UT2. The data units (e.g., packets or radio transmission units, cells . . . ) scheduled by the MBS of BS 610 for transmission to UT1 and UT2 are shown in FIG. 6, with data units being transmitted via B band and E band for both UT1 and UT2. This may allow, for example, BS 610 to approximately balance the traffic load on two or more available frequency bands that are serving a UT or mobile node, e.g., UT1 and UT2. For example, the MBS of BS 610 may transmit one or more data units to UT2 via B band, and may transmit one or more packets to UT2 via E band and via RN 612. BS 610 may similarly transmit a flow or stream of packets to UT1 via both B band and E band.

Figure 7:
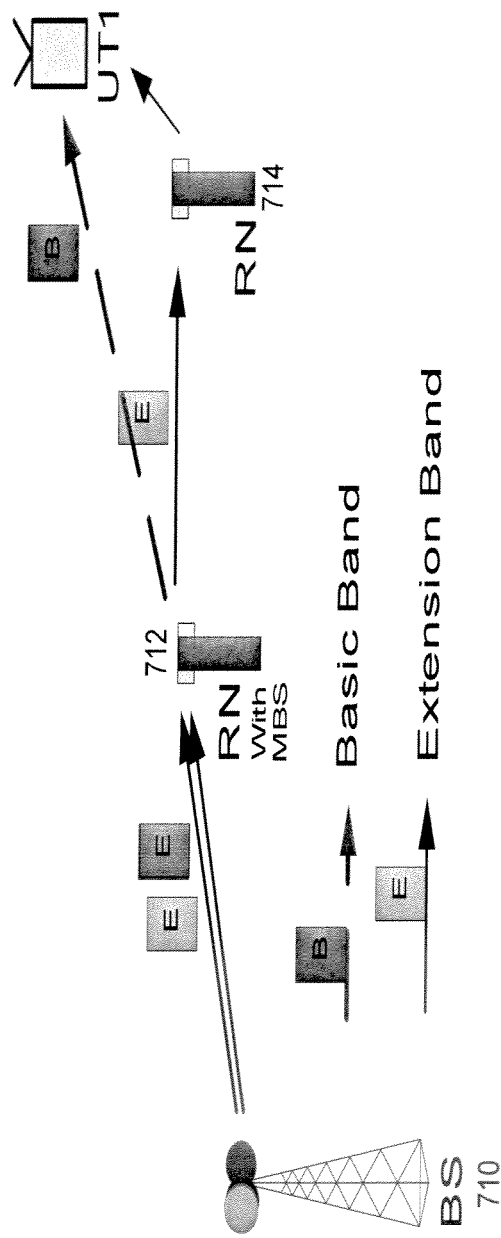
FIG. 7 is a diagram illustrating a wireless network that includes a multi-band relay node according to an example embodiment.

FIG. 7 is a diagram illustrating a wireless network that includes a multi-band relay node according to an example embodiment. BS 710 may include a MBS and may transmit on one or both bands, B band and/or E band, as an example. RN 712 may also include a MBS and may transmit on both B band and E band. In this example, BS 710 transmitted two data units to RN 712 via E band. RN 712 may receive these two data units via E band, and, based on a decision or determination of the MBS of RN 712, RN 712 may transmit one of the data units via B band to UT1, and the other data unit via E band to UT1. The data unit transmitted from RN 712 via E band may be relayed by RN 714 to UT1. Thus, the MBS of RN 712 may schedule received data units for transmission on a same band or a different band on which they were received. Thus, with a MBS, data units received via E band may be scheduled for transmission to UT1 via either E band or B band, or both. In this example, the first and second data units received via E band are forwarded to UT1 via B band and E band, respectively, as shown. Thus, for example, an MBS of an infrastructure node may received data units via a first band, and schedule the data units for transmission via a second band, or a combination of frequency bands, depending on the situation, for example.

For example, link quality or delay may be more favorable for the B band (e.g., since fewer hops), as compared to the E band. Thus, a stream or flow of data units that have requested low delay or relatively high QoS (quality of service) may be received by an MBS of a RN via E band, and then scheduled for transmission over a band (or bands) that provides the requested delay or QoS requirements for the flow or data units, e.g., via band B.

Figure 8:
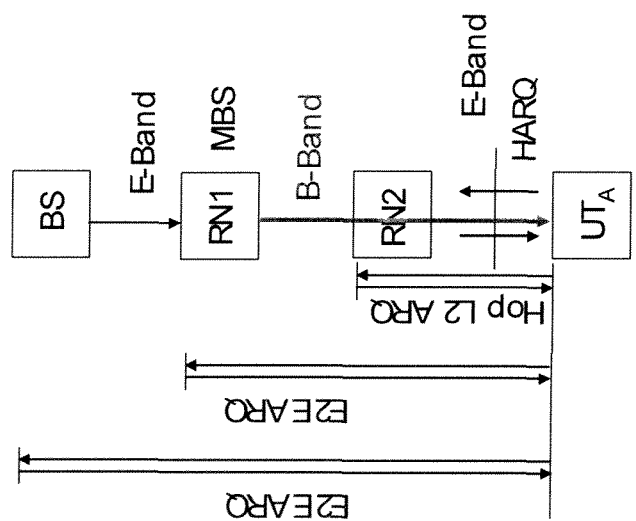
FIG. 8 is a diagram of a wireless network according to another example embodiment in which an ARQ or automatic repeat request type process is used.

FIG. 8 is a diagram of a wireless network according to another example embodiment in which an ARQ or automatic repeat request type process is used. A number of different kinds of ARQ processes may be used, and a few examples are mentioned here, but the disclosure is not limited thereto. According to an example embodiment, one or more ARQ (automatic repeat request) processes may be used to provide error control or data unit retransmission. ARQ may include, for example, the use of a receiving node sending an acknowledgement (ACK) or block acknowledgement to indicate when a data unit was successfully received, or a negative acknowledgement (NAK) to indicate when a corrupted data unit was received. A sending node may, for example, retransmit the data unit if the sending node received a NAK, or a timeout occurred before the sending node received an ACK or other indication that the data unit was successfully received.

As another example, a hybrid ARQ (HARQ) process in which data units are encoded using an error-correction code (e.g., Reed Solomon code or Turbo code) and error-detection information (e.g., CRC or cyclic redundancy check) is appended to the data unit before transmission or retransmission. Or, for example, a chase combining HARQ process may be used in which the transmitted data unit may be coded and retransmitted. Or, an incremental redundancy HARQ process may be used in which a data unit may be retransmitted using a different coding rate and/or different puncturing techniques, as compared to transmission of the original data unit. Other ARQ processes may be used.

Referring to FIG. 8, an end-to-end (E2E) ARQ process may be provided between the base station (BS) and a user terminal (UTA). RN1, in this example embodiment, may include an MBS, which may allow RN1 to transmit (or retransmit) data units on a selected frequency band of a plurality of frequency bands, and which may be a different band than the data unit was received with. A hybrid ARQ process may be provided between RN2 and UTA, for example.

The E2E ARQ between BS and UTA may provide reliable data transmission between BS and UT, e.g., in the case of handovers in a single band "E" band for example in which original transmissions from the BS to UTA are provided via E band). Although not shown, a data unit may be initially forwarded from BS to UTA via E band. However, in this example the data unit is not successfully received at UTA. The BS-UTA E2E ARQ may typically cause BS to retransmit the data unit. However, in this example, as shown in FIG. 8, there may also be an E2E ARQ provided between RN1 and UTA. If the Hop ARQ transmission on E band (between RN2 and UTA) was not successful, then RN1 may retransmit the data unit via E band or B band. A retransmission from RN1 via B band directly to UTA is shown in FIG. 8.

For example, RN1 may monitor measurement results (e.g., channel quality indications or CQI for a channel on B band and another channel on E band) that the UTA (user terminal A) may send to RN1 for handover purposes, e.g., received signal strength of radio access points (e.g., RSSI signals relating to RN1 via band B and RN2 via band E). For example, the UT may be served by RN2 via E band or via B band directly from RN1. If RN1 B band starts to become a candidate to transmit to UTA, then RN1 may request a block ACK (or a periodic block ACK) from the RN2 that is currently serving UTA. RN1 may also request an acknowledgement or block ACK from UTA. The period for RN2 reporting block ACKs to RN1 may be shorter than the time interval for E2E ARQ between BS and UT, for example. Based on the received block ACKs and channel quality indications, RN1 may decide to move UTA to B band and initiate retransmission via B band. The decision to move or transfer the UTA to B band may also be based on a variety of other factors, such as delay requirements or QoS criteria of a flow or application providing the data units.

To move the UTA from band E to band B, RN1 may perform a context transfer. A transmission data queue may be provided within RN1 for each band (band E and band B). Also, control data may be stored in RN1 relating to any data transfers and retransmissions, such as data units that are not yet successfully received, or which data units have been retransmitted, etc. For example, a context transfer may include transferring data units stored in a first data transmission queue associated with the E band to a second data transmission queue associated with the B band, at RN1, for example. Also, as part of the context transfer, control data associated with the transmission of data via the original band or associated with a flow or group of data units may be reassigned (or transferred) from the old band (band E in this example) to the new band (band B in this example). The transfer of data units may involve physically moving data units from the first data transmission queue to the second data transmission queue, or may involve providing an indication in memory or in the queues that the data units have been reassigned to the second (or new) frequency band. Similarly, the reassignment of control data may involve physically moving such data from a buffer or memory area associated with the old (or first) band to a buffer or memory area associated with the new or second band, or may involve providing an indication that such control data is now assigned to the second or new band (band B in this example). More details are provided below regarding an example MBS (multi-band scheduler) and the use of data transmission queues at a multi-band wireless node.

Referring to FIG. 8, in one example embodiment, the UTA may move (e.g., via context transfer) to the B band to receive the retransmissions from RN1, and then may return (e.g., via context transfer) to the E band to be served by RN2 again. In such case, the UTA may signal RN2 that it will not be available. After receiving the retransmissions from RN1 via B band, UTA may (e.g., perform a context transfer to E band) return to the E band and send, via E band, a block ACK to RN2, or may send an ARQ or HARQ status report to RN2 to indicate which data units have been received, for example. Thus, RN2 may receive an indication of which packets the UTA has received correctly and it can remove those data units from its buffer or transmission queues (e.g., and may initiate retransmission of other data units per the ARQ or HARQ process that has been implemented).

Figure 9:
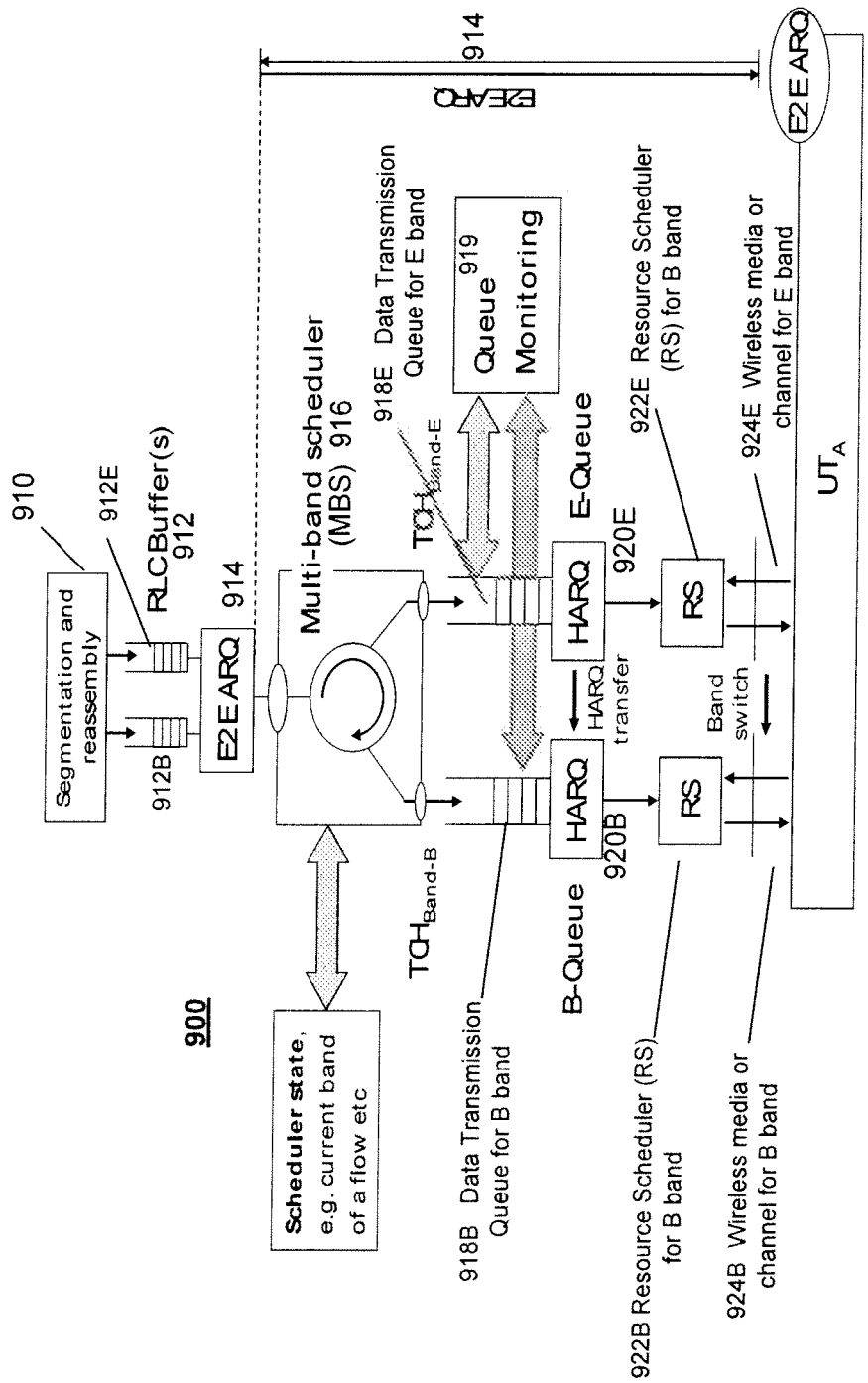
FIG. 9 is a block diagram of a wireless node according to an example embodiment.

FIG. 9 is a block diagram of a wireless node according to an example embodiment. The wireless node 900 may be a base station or access point, a relay node, or a user terminal or mobile station. Although the structure or implementation may be different for different kinds of wireless nodes.

Referring to FIG. 9, for example, as a base station or AP, network packets may be received and segmented into smaller units for transmission by segmentation and reassembly block 910. These smaller units may be referred to as data units or radio transmission units, or other units. The data units are stored in RLC (radio link control) buffers 912. A RLC buffer 912 may be provided for each frequency band, e.g., RLC buffer 912B to store data units received via band B, and RLC buffer 912E to store data units received via band E, as an example.

An end-to-end (E2E) ARQ process may be provided, e.g., between the node and a user terminal, such as UTA (user terminal A). The ARQ process 914 (which may be considered an outer ARQ) may include adding a MAC (media access control) address, a transmission sequence number, and a CRC checksum for error detection. The RLC layer may be provided in the base station and/or relay nodes.

A multi-band scheduler (MBS) 916 may schedule the data units (or radio transmission units) for transmission in one of a plurality of frequency bands. In this example, two bands are shown, B band and E band, but any number of bands may be provided. MBS 916 may, for example, store data units in a selected data transmission queue to await transmission over the selected frequency band. For example, if band B was selected by MBS 916 for transmission, the data unit may be placed in data transmission queue 918B for B band. If band E was selected by MBS 916 for transmission, the data unit may be placed in data transmission queue 918E for E band.

A separate inner ARQ process, such as a HARQ (Hybrid ARQ) process 920 may be provided for some flows for each frequency band. This inner ARQ may be, for example, a HARQ process 920B for B band, and a HARQ process 920E for E band. HARQ may be, for example, a 1-hop ARQ process and may be a variation of the ARQ error control method. As part of each HARQ process, the data unit may be encoded (e.g., using Turbo code or Reed-Solomon code, or other code) and a CRC may be added for error detection, and a sequence number may be added for retransmissions. A block of data may be encoded, and therefore, the transmitted data units from each HARQ may in some cases be referred to, for example, as FEC (forward error correction) blocks or other data units. Or these units may simply be referred to as data units, which may include FEC blocks or other data units.

The HARQ processes 920 in FIG. 9 may be any type of HARQ process, such as chase combining HARQ, or incremental redundancy HARQ, or other HARQ process. In chase combining, a data unit that was originally transmitted is retransmitted, and the destination node may use both copies (original and retransmission copies) of the data unit to improve decoding. This may involve resending the same encoded bits. In incremental redundancy, a different set of encoded bits may be sent in the retransmission, e.g., by using a different coding rate and/or different puncturing pattern for the retransmitted data unit (as compared to the originally transmitted data unit). Data may be coded, punctured and interleaved before transmission, according to an example embodiment.

The MBS 916 may enable fast switching between multiple frequency bands or simultaneous operation on multiple bands. MBS 916 may distribute the data units to the available bands (e.g., band B and band E). A queue monitor or queue monitoring block 919 may monitor the status of the data transmission queues 918B and 918E, and may monitor the delays or average delay in each data transmission queue. The queue monitoring block 919 may facilitate or assist in the prioritization of retransmissions, reschedule packets if delays in a queue for a band increase beyond a threshold, and further may facilitate or assist with band changes between user terminals or for flows or other groups of data units.

A context transfer may be performed to allow for or facilitate a band change (a use of a new frequency band for data transmission). The context transfer may be performed for all data units, for a flow of data units, for data units addressed to or directed to a user terminal, or for data units of a specific QoS or traffic type, as examples.

A context transfer may include, for example, transferring data units stored in a first data transmission queue associated with a first frequency band to a second data transmission queue associated with a second frequency band (e.g., transferring data units from queue 918B to queue 918A or vice versa). This may involve physically transferring data units between different queues or buffers or may involve merely reassigning the data units to the new data queue or frequency band, such as, e.g., providing an indication or field in memory indicating the association of the data unit(s) to the new band or queue. The data queues may be physically separate queues or may be part of shared memory used by both frequency bands for transmission. For example, each resource scheduler 922 may have access to transmission queues of multiple or all frequency bands. Thus, for example, data units may be stored in memory or a buffer, and an indication may be provided in the memory or buffers for each data unit identifying the associated frequency band or frequency band for which the data unit has been assigned by the MBS, and this band assignment data may be updated for at least some data units during a context transfer, for example. The context transfer may also include assigning newly received data units of the transferred flow to the new (or second) frequency band or assigning the new data units to the data transmission queue associated with the new band.

The context transfer may also include reassigning control data associated with a frequency band to a new frequency band. This control data may relate to the transmission and/or retransmission of data over the band, such as, for example: which data units have been transmitted, which data units have been retransmitted, incremental redundancy information for retransmitted data (e.g. redundancy versions of the data that have already been retransmitted), a requested QoS or delay constraints of a flow or other information describing the flow, and/or other information.

The context transfer may be performed, for example, for all data units flowing through a node (or received by or transmitted from a node), or may be performed for a flow (a per flow context transfer), per application or per user terminal context transfer (e.g., transfer data units and/or control data originated by a specific application or directed to a specific user terminal). Both before and after a context transfer, a same flow ID, and a same user terminal ID, and same destination address, may be used.

A single flow of data units ma) be transmitted on a single band, or a single flow may be transmitted across two or more bands. Thus, one (common) set of data unit sequence numbers may be used for data units transmitted as part of a flow or to a user terminal, for example, even when multiple bands are used to transmit the flow. This may allow a destination or receiving node to recombine the data units of the flow in a proper order that were transmitted over different bands, based on decisions of the MBS 916. In another example embodiment, a common (or one) set of sequence numbers used for a flow or user terminal for a first frequency band may be continued for transmissions via a new frequency band after a context transfer for the flow or user terminal to the new band.

Referring to FIG. 9, a resource scheduler 924 may be provided for each frequency band to schedule data units for transmission via resources of the frequency band. For example, a resource scheduler 922B for B band may map bits from data transmission queue 920B onto wireless media resources (e.g., channels and/or subchannels) of B band for transmission (e.g., map bits onto channels or subchannels/subcarriers of B Band). Each channel may include, for example, one or more subcarriers or time slots. Similarly, resource scheduler 922E for E band may map bits from data transmission queue 920E onto wireless media resources (e.g., channels and/or subchannels) of the E band (e.g., map bits onto subcarriers of E Band).

In an example embodiment, each resource scheduler 922B, 922E, etc., may have access to at least the data stored in the associated data transmission queue, and may obtain channel state information or channel quality indications or CQI (e.g., RSSI or SINR information) for the channels of the associated frequency band to allow the resource scheduler to select a best group of channels or a subset of channels to be used for transmission within the frequency band. As described below, according to an example embodiment, a data unit may be transmitted via a first frequency band, and then (e.g., after a context transfer) retransmitted on a second frequency band, as part of an ARQ or HARQ process.

In an example embodiment, synchronization between the two bands may be provided as part of a context transfer, or prior to context transfer. It may be desirable, at least in some situations, to reduce the period of time the user terminal needs to stay synchronized with both bands. To facilitate synchronization or a fast context transfer, a message may be sent from the infrastructure node to the user terminal indicating a time shift between the two bands the time shift of the beginning of the next frame on the other band or new band), frequency shift between the two bands or between the two channels used of the two bands, and/or other system information such as position of the allocation table or resource allocation table. In some cases, the band switch (e.g., the location or identity of the new frequency band) may be known in advance and preparations may be started. For example, if the BS knows that the E band is not available anymore after 5 ms, then it can request the user terminal or mobile node to synchronize with the B band. The UT may also estimate the path loss or channel state or provide a channel quality indication to the infrastructure node or BS before switching to the B band (new band in this example). When the UT switches the band this channel or CQI information may be forwarded from the E band resource scheduler to the B band resource scheduler, for example.

Figure 10:
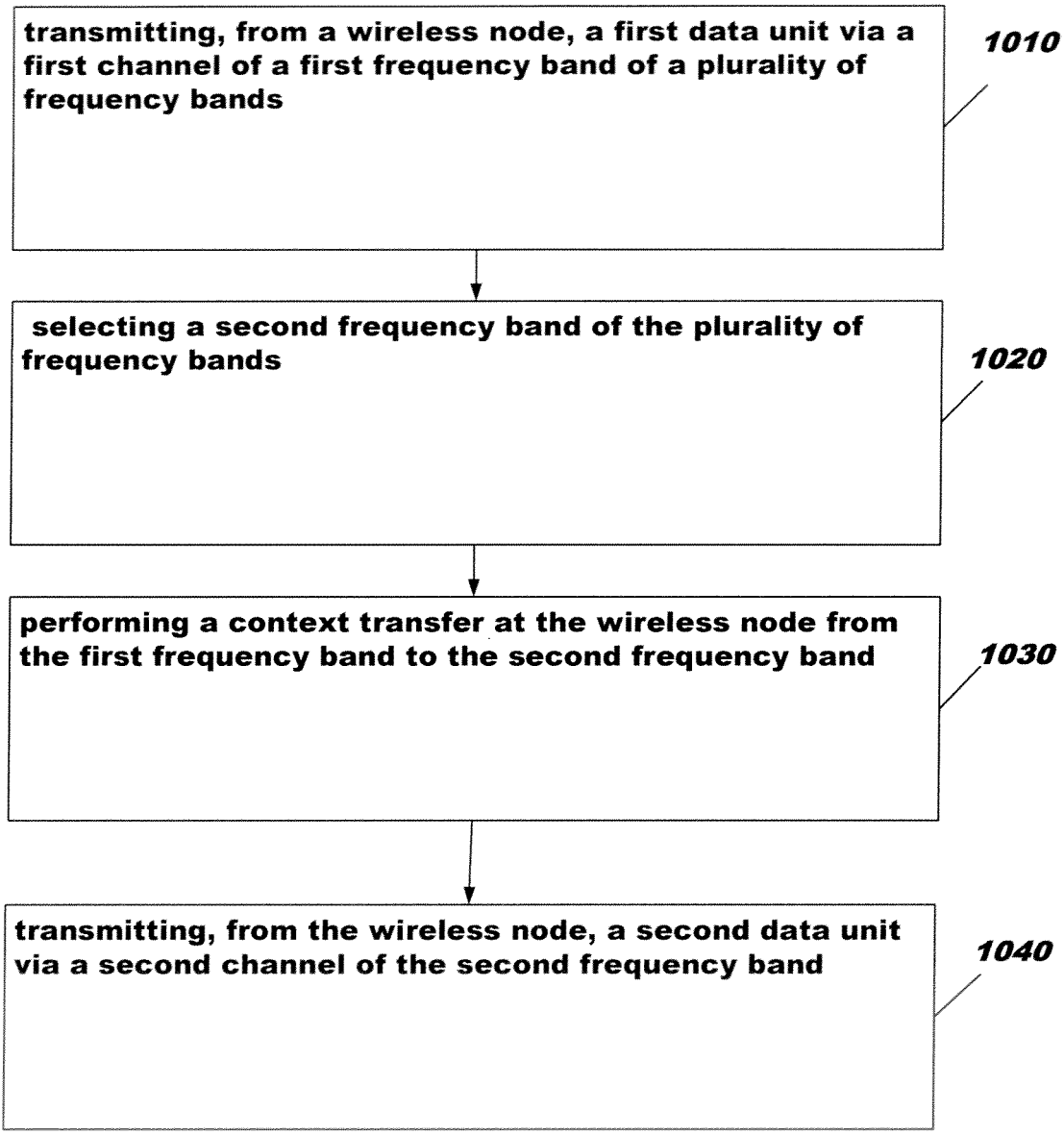
FIG. 10 is a flow chart illustrating operation of a wireless node according to an example embodiment.

FIG. 10 is a flow chart illustrating operation of a wireless node according to an example embodiment. The method may include transmitting, from a wireless node, a first data unit via a first channel of a first frequency band of a plurality of frequency bands 1010, selecting a second frequency band of the plurality of frequency bands 1020, performing a context transfer at the wireless node from the first frequency band to the second frequency band 1030, and transmitting, from the wireless node, a second data unit via a second channel of the second frequency band 1040.

For example, the first channel may include one or more subcarriers within the first frequency band, and the second channel may include one or more subcarriers within the second frequency band.

In an example embodiment, the performing a context transfer (1030) may include reassigning data units and associated control data from the first frequency band to the second frequency band.

In an example embodiment, the performing a context transfer (1030) may include transferring data units stored in a first data transmission queue associated with the first frequency band to a second data transmission queue associated with the second frequency band, and re-assigning control data associated with the first frequency band from the first frequency band to the second frequency band.

In an example embodiment, the performing a context transfer (1030) may include transferring or re-assigning data units and associated control data that are assigned to a first resource scheduler associated with the first frequency band to a second resource scheduler associated with the second frequency band.

In an example embodiment, the flow chart illustrated in FIG. 10 may further include retransmitting, after performing the context transfer, the first data unit via the second channel of the second frequency band. In an example embodiment, the retransmitting the first data unit via the second channel of the second frequency band may be part of: an automatic repeat request (ARQ) process; a hybrid ARQ (HARQ) process in which data units are encoded using an error-correction code (e.g., Reed Solomon code or Turbo code) and error-detection information (e.g., CRC or cyclic redundancy check) is appended to the data unit before transmission or retransmission; a chase combining HARQ process in which the first data unit is coded and retransmitted via the second channel of the second frequency band; and/or an incremental redundancy HARQ process in which the first data unit transmitted via the first channel of the first frequency band and the retransmitted first data unit retransmitted via the second channel of the second frequency band are encoded differently or coded using different coding rates and/or different puncturing techniques.

In an example embodiment, an apparatus may include a wireless transceiver, a controller or processor, memory, and a multi-band scheduler (such as MBS 916, FIG. 9). The apparatus may be configured to transmit, from a wireless node, a first data unit via a first channel of a first frequency band of a plurality of frequency bands; select a second frequency band of the plurality of frequency bands; perform a context transfer at the wireless node from the first frequency band to the second frequency band; and transmit, from the wireless node, a second data unit via a second channel of the second frequency band.

The apparatus may be, for example, one of: a wireless access point, base station, or node B; a wireless relay node or relay station; or a wireless user terminal or mobile station.

Figure 11:
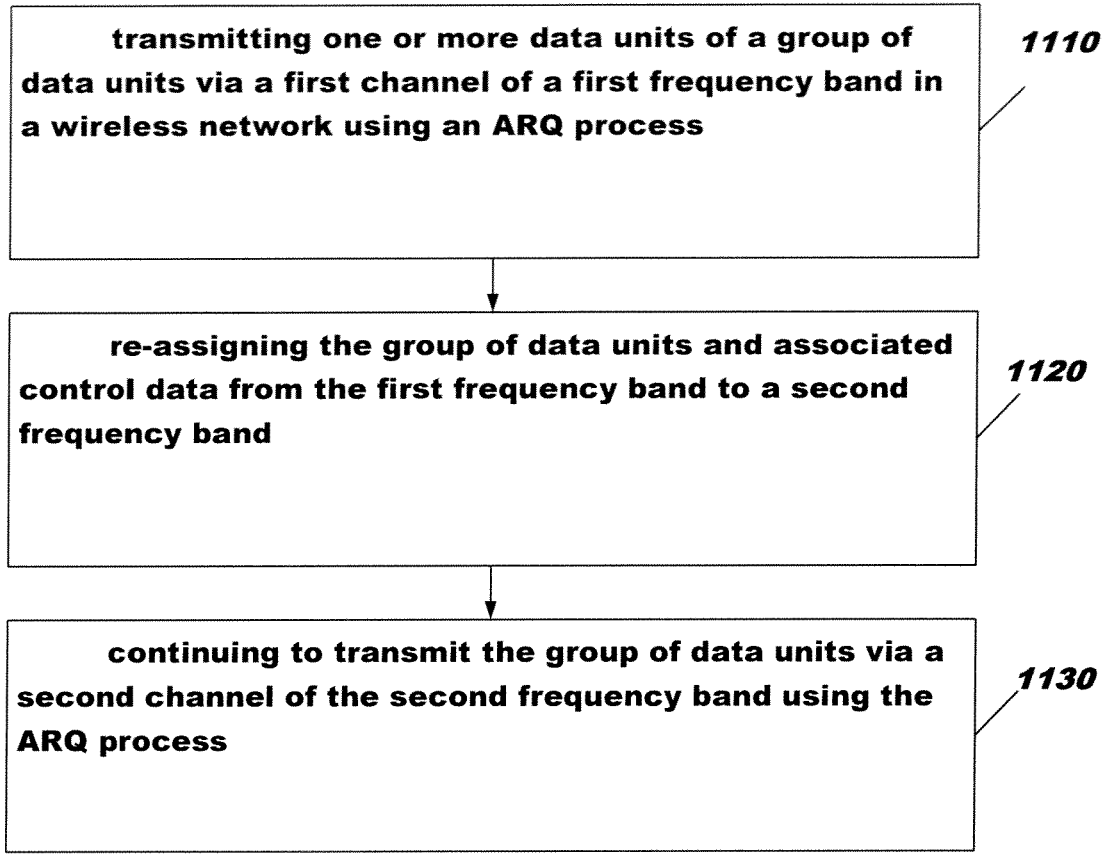
FIG. 11 is a flow chart illustrating operation of a wireless node according to another example embodiment.

FIG. 11 is a flow chart illustrating operation of a wireless node according to another example embodiment. The flow chart of FIG. 11 may include transmitting one or more data units of a group of data units via a first channel of a first frequency band in a wireless network using an ARQ process (1110); re-assigning the group of data units and associated control data from the first frequency band to a second frequency band (1120); and continuing to transmit the group of data units via a second channel of the second frequency band using the ARQ process (1130).

In an example embodiment, the group of data units may include one of: a flow of data units; data units directed to or addressed to a specific wireless user terminal, mobile station or destination address; or data units designating one or more specific QoS (quality of service) requirements.

In an example embodiment, an apparatus may include a wireless transceiver (1602), and a multi-band scheduler (e.g., MBS 916). The apparatus may be configured to: transmit one or more data units of a group of data units via a first channel of a first frequency band in a wireless network using an ARQ process; re-assign the group of data units and associated control data from the first frequency band to a second frequency band; and continue to transmit the group of data units via a second channel of the second frequency band using the ARQ process.

Figure 12:
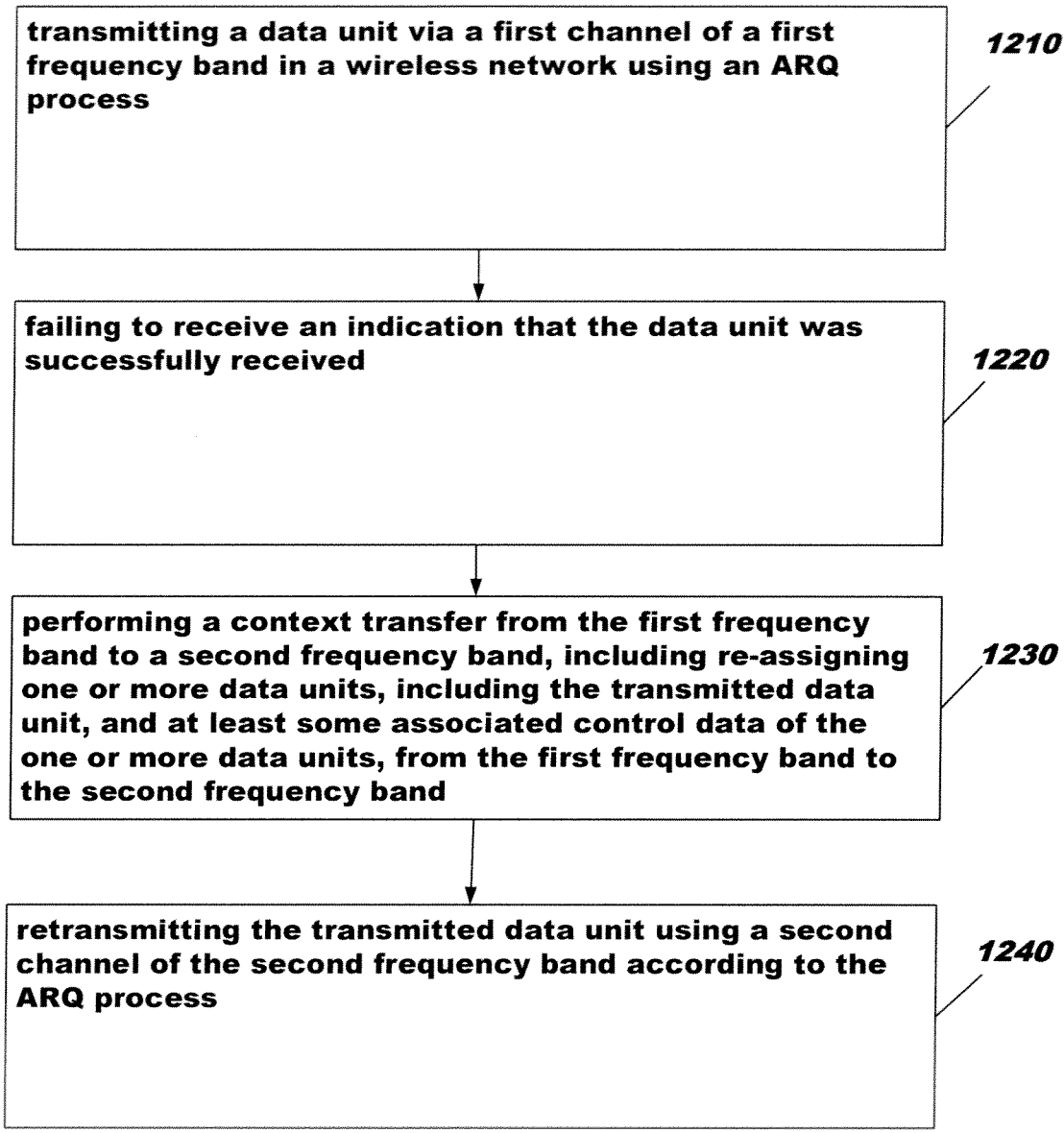
FIG. 12 is a flow chart illustrating operation of a wireless node according to another example embodiment.

FIG. 12 is a flow chart illustrating operation of a wireless node according to another example embodiment. In an example embodiment, the flow chart of FIG. 12 may include transmitting a data unit via a first channel of a first frequency band in a wireless network using an ARQ process (1210); failing to receive an indication that the data unit was successfully received (1220); performing a context transfer from the first frequency band to a second frequency band, including re-assigning one or more data units, including the transmitted data unit, and at least some associated control data of the one or more data units, from the first frequency band to the second frequency band (1230); and retransmitting the transmitted data unit using a second channel of the second frequency band according to the ARQ process (1240).

In another example embodiment, an apparatus may be provided for use in a wireless node including: a wireless transceiver, and a controller. The apparatus (or the controller) may be configured to: transmit a data unit via a first channel of a first frequency band in a wireless network using an ARQ process; fail to receive an indication that the data unit was successfully received; perform a context transfer from the first frequency band to a second frequency band, including re-assigning one or more data units, including the transmitted data unit, and at least some associated control data of the one or more data units, from the first frequency band to the second frequency band: and retransmit the transmitted data unit using a second channel of the second frequency band according to the ARQ process.

Figure 13:
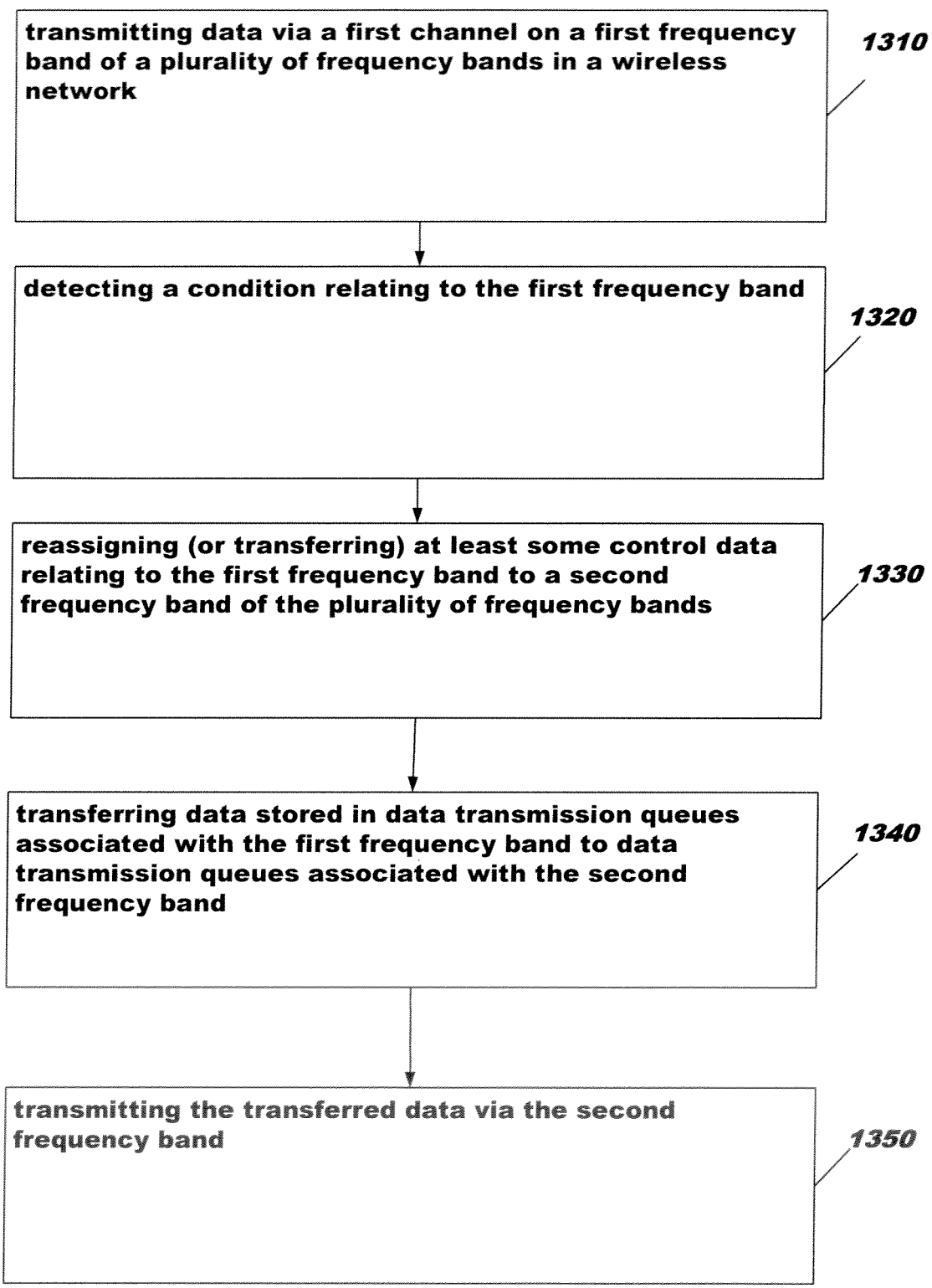
FIG. 13 is a flow chart illustrating operation of a wireless node according to another example embodiment.

FIG. 13 is a flow chart illustrating operation of a wireless node according to another example embodiment. The flow chart of FIG. 13 may include transmitting data via a first channel on a first frequency band of a plurality of frequency bands in a wireless network (1310); detecting a condition relating to the first frequency band (1320); reassigning (or transferring) at least some control data relating to the first frequency band to a second frequency band of the plurality of frequency bands (1330); transferring data stored in data transmission queues associated with the first frequency band to data transmission queues associated with the second frequency band (1340); and transmitting the transferred data via the second frequency band (1350).

According to another example embodiment, an apparatus may include a wireless transceiver, and a controller. The apparatus (or the controller) may be configured to: transmit data via a first channel on a first frequency band of a plurality of frequency bands in a wireless network; detect a condition relating to the first frequency band; reassign at least some control data relating to the first frequency band to a second frequency band of the plurality of frequency bands; transfer data stored in data transmission queues associated with the first frequency band to data transmission queues associated with the second frequency band; and transmit the transferred data via the second frequency band.

Figure 14:
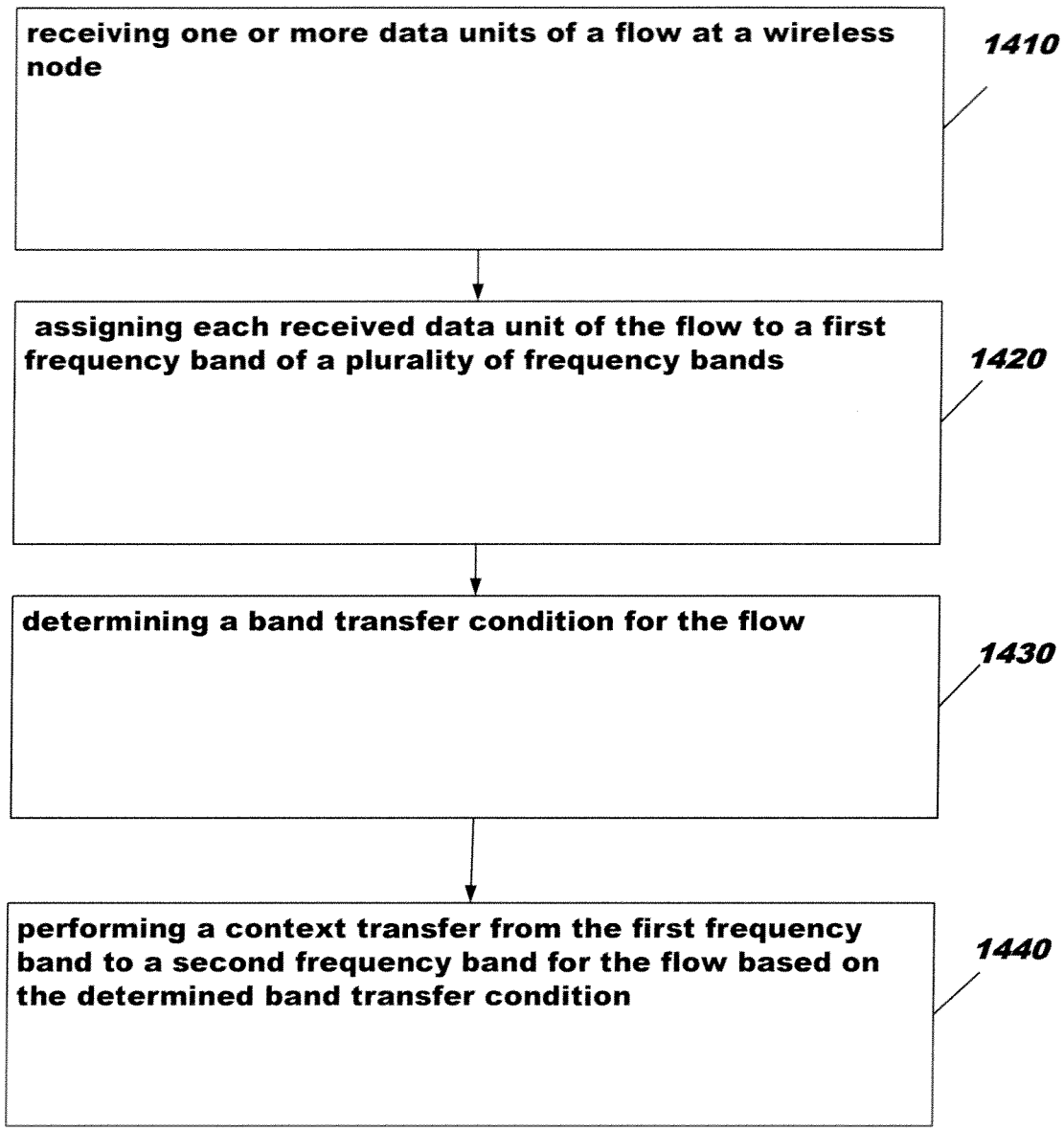
FIG. 14 is a flow chart illustrating operation of a wireless node according to another example embodiment.

FIG. 14 is a flow chart illustrating operation of a wireless node according to another example embodiment. The flow chart of FIG. 14 may include receiving one or more data units of a flow at a wireless node (1410); assigning each received data unit of the flow to a first frequency band of a plurality of frequency bands (1420); determining a band transfer condition for the flow (1430); and performing a context transfer from the first frequency band to a second frequency band for the flow based on the determined band transfer condition (1440).

In an example embodiment, the receiving one or more data units of a flow at a wireless node (1410) may include: receiving one or more packets; and segmenting each packet into one or more radio transmission units or other data units for transmission.

In an example embodiment, the assigning each received data unit of the flow (1420) may include assigning each received data unit of the flow to a first frequency band of a plurality of frequency bands. In an example embodiment, the assigning (1420) may be performed based on one or more of the following: a channel quality indication or other measurement for one or more of the frequency bands; quality of service constraints or requirements of the flow as compared to a quality of service being provided by each of the plurality of frequency bands; and an amount of traffic, load or congestion on one or more of the frequency bands.

In an example embodiment, the determining a band transfer condition (1430) may include determining or detecting one or more of: an unavailability of at least a portion (e.g., channel or subchannel) of the first frequency band for the flow; a network congestion or traffic load on at least a portion (e.g., channel or subchannel) of the first frequency band that exceeds a congestion threshold; a channel quality indication for at least a portion (e.g., channel or subchannel) of the first frequency band that identifies a channel quality less than a channel quality threshold; a Quality of Service (QoS) for at least a portion (e.g., channel or subchannel) of the first frequency band is less than a QoS required or requested by the flow; a network congestion or traffic level of at least a portion (e.g., channel or subchannel) of the first frequency band is higher than a network congestion or traffic level for at least a portion of the second frequency band; a channel quality of at least a portion (e.g., channel or subchannel) of the second frequency band is a higher or more favorable quality than at least a portion of the first frequency band; and/or a QoS of at least a portion (e.g., channel or subchannel) of the second frequency band is higher than the QoS of at least a portion of the first frequency band.

In an example embodiment, the performing a context transfer from the first frequency band to a second frequency band for the flow based on the determined band transfer condition (1440) may include transferring data units stored in a first data transmission queue associated with the first frequency band to a second data transmission queue associated with the second frequency band; re-assigning control data associated with the first frequency band from the first frequency band to the second frequency band; and assigning any newly received data units for the flow to the second frequency band.

Figure 15:
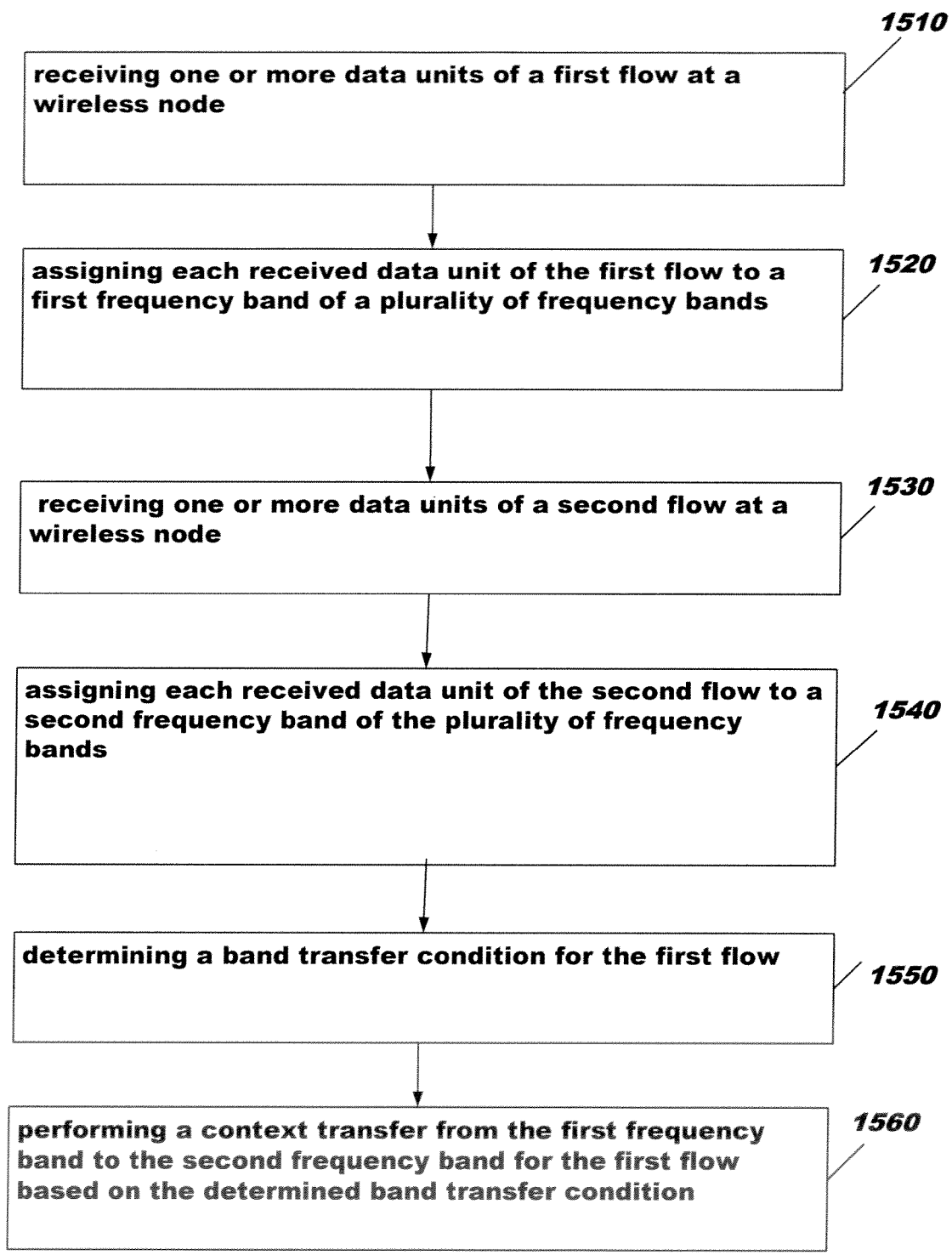
FIG. 15 is a flow chart illustrating operation of a wireless node according to yet another example embodiment.

FIG. 15 is a flow chart illustrating operation of a wireless node according to yet another example embodiment. The flow chart or method of FIG. 15 may include receiving one or more data units of a first flow at a wireless node (1510); assigning each received data unit of the first flow to a first frequency band of a plurality of frequency bands (1520); receiving one or more data units of a second flow at a wireless node (1530); assigning each received data unit of the second flow to a second frequency band of the plurality of frequency bands (1540); determining a band transfer condition for the first flow (1550); and performing a context transfer from the first frequency band to the second frequency band for the first flow based on the determined band transfer condition (1560).

In an example embodiment, the performing a context transfer (1560) may include assigning one or more of the data units of the first flow, and associated control data, to the second frequency band.

In an example embodiment, the flow chart of FIG. 15 may further include transmitting, before performing the context transfer, data units of the first flow via a first channel of the first frequency band; transmitting, after performing the context transfer, data units of the first flow via a second channel of the second frequency band; and transmitting data units of the second flow via a third channel of the second frequency band.

In another example embodiment, a multi-band scheduler (such as MBS 916, FIG. 6) may be provided for use in a wireless node. The multi-band scheduler may be configured to; receive one or more data units of a flow; assign each received data unit of the flow to a first frequency band of a plurality of frequency bands; determine a band transfer condition for the flow; and perform a context transfer from the first frequency band to a second frequency band for the flow based on the determined band transfer condition.

In yet another example embodiment, an apparatus may include a data transmission queue for each of a plurality of frequency bands including at least a first data transmission queue for a first frequency band and a second data transmission queue for a second frequency band; a multi-band scheduler (e.g., MBS 916) configured to receive data units, and to assign each data unit to one of the data transmission queues for one of the frequency bands; a resource scheduler for each of the plurality of frequency bands, including at least; a first resource scheduler configured to schedule data units from the first data transmission queue for transmission via resources of the first frequency band; and a second resource scheduler configured to schedule data units from the second data transmission queue for transmission via resources of the second frequency band.

The apparatus may be configured to perform a context transfer from the first frequency band to the second frequency band, including transferring data units from the first data transmission queue to the second data transmission queue; and reassigning control data associated with the transferred data units, from the first frequency band or the first resource scheduler to the second frequency band or the second resource scheduler.

According to another example embodiment, B band may be dedicated to a network operator, while E band may be shared among multiple network operators (depending on the area). For example, where use of the E band is not prohibited, a network may communicate via the E band, e.g., to extend coverage or provide additional services or higher throughput, or lower network latency service, etc., through the additional capacity of the E band. For example, a satellite operator may prohibit transmissions or usage of the E band within a specific range (e.g., 50 km) of the satellite base stations. Thus, when a 4G (or other network operator) AP or BS is outside this exclusion range, then the 4G network may also use the extension band (E band), in addition to the B band which may be dedicated to the 4G network operator.

As an example, the extension (E) band may be shared among multiple network operators of the same technology, such as among two WiMAX network operators. Or, the E band may be shared (when not prohibited) among network operators of different technologies, such as between a satellite operator (or satellite network operator) and a 4G network operator, for example. Thus, the network operator may always use their dedicated frequency band (e.g., B band), and when not prohibited (e.g., not within the exclusion zone for E band), the network operator may also use the extension (or E band).

For example, when a network is using two frequency bands, (e.g., B band and E band), then control data or other important signals may be communicated via the dedicated band (e.g., B band), while data or lower priority signals may be communicated via the Extension band or E band.

In another example embodiment, a frequency band may be shared among technologies where there may not be a network operator, such as for radar (as an example). Thus, a radar user may share the frequency band with a network operator or user of another technology, such as cellular, WiMAX, etc. The term network operator may therefore encompass users of the frequency band in such situations.

For example, a method may include using a first frequency band for communication, the first frequency band being dedicated to a network operator; making a determination that a second frequency band is available for use (e.g., determining that an infrastructure node is outside of an exclusion zone or is not otherwise prohibited from using the second frequency band), the second frequency band, at least in some areas, being shared among a plurality of network operators; and using the second frequency band based on the determination, in addition to the first frequency band.

In an example embodiment, the second frequency band may be shared among network operators of a same technology (e.g., two WiMAX operators). Or, in another example embodiment, the second frequency band may be shared among network operators of a different technology (e.g., 4G and satellite operators sharing the extension band).

According to another example embodiment, a method may include using a first frequency band to transmit data units of a first priority type; and using a second frequency band to transmit data units of a second priority type. For example, high priority traffic, e.g., VoIP (Voice over IP) packets or data units may be communicated via a first frequency band (B band). And, lower priority traffic (e.g., data or best efforts traffic) may be communicated via a second frequency band (e.g., E band). User terminals may in some cases be charged extra (or may pay an additional amount) to receive wireless services over the high priority or extension band, for example.

Figure 16:
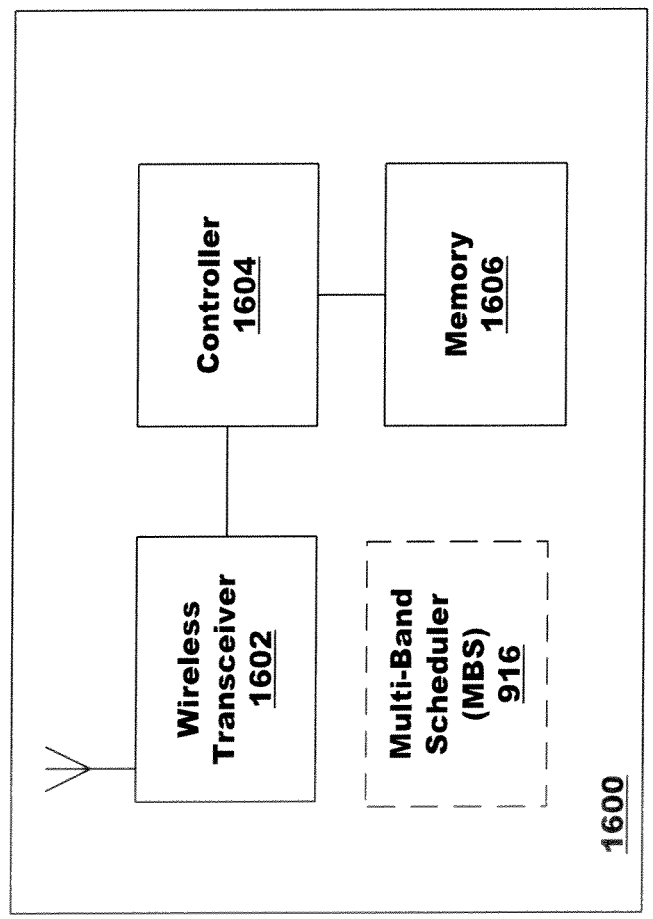
FIG. 16 is a block diagram illustrating an apparatus that may be provided in a wireless node according to an example embodiment.

FIG. 16 is a block diagram illustrating an apparatus 1600 that may be provided in a wireless node according to an example embodiment. The wireless node may include, for example, a wireless transceiver 1602 which may include a transmitter to transmit signals and a receiver to receive signals, a controller 1604 to control operation of the station and execute instructions or software, and a memory 1606 to store data and/or instructions. The apparatus 1600 may further include a MBS 916, such as described above with respect to FIG. 9.

Controller (or processor) 1604 may be programmable and capable of executing software or other instructions stored in memory or on other computer media to perform the various tasks and functions described herein.

In addition, a storage medium 1606 may be provided that includes stored instructions, when executed by a controller or processor that may result in the controller 604, or other controller or processor, performing one or more of the functions or tasks described herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

What is claimed is:

1. A method comprising:
receiving, at a user terminal, data units of a first flow of data units from a first infrastructure node via a first frequency band of a plurality of frequency bands;
receiving, at the user terminal, one or more other data units of a second flow of data units containing different data from said first flow of data units forwarded from a second infrastructure node via a second frequency band of the plurality of frequency bands, said second frequency band being different from said first frequency band;
providing, by the user terminal, an ARQ or HARQ status report or block ACK to the first infrastructure node via the first frequency band but not to the second infrastructure node to indicate the data units received from said second infrastructure node via said second frequency band, wherein the first infrastructure node and the second infrastructure node are base stations; and
continuing to receive data units from the second infrastructure node via the second frequency band according to the ARQ process.

2. The method of claim 1, wherein receiving one or more data units forwarded from said second infrastructure node via said second frequency band comprises:
performing a context transfer from the first frequency band to the second frequency band.

3. The method of claim 1, wherein providing an ARQ or HARQ status report or block ACK to the first infrastructure node comprises:
performing a context transfer from the second frequency band to the first frequency band.

* * * * *